United States Patent [19]
Corwin et al.

[11] 4,268,231
[45] May 19, 1981

[54] MULTI-UNIT ROTARY PISTON MECHANISM AND MAINSHAFT COUPLING THEREFOR

[75] Inventors: Howard R. Corwin, Montclair; Charles Jones, Hillsdale, both of N.J.

[73] Assignee: Curtiss-Wright Corporation, Wood-Ridge, N.J.

[21] Appl. No.: 27,147

[22] Filed: Apr. 4, 1979

[51] Int. Cl.³ .................. F01C 11/00; F01C 21/04; F16D 3/18
[52] U.S. Cl. ............................ 418/60; 418/94; 418/151; 64/9 R
[58] Field of Search ............. 418/60, 94, 151; 64/9 R, 13

[56] References Cited

U.S. PATENT DOCUMENTS

| | | | |
|---|---|---|---|
| 1,942,782 | 1/1934 | Smith | 64/9 R |
| 2,691,875 | 10/1954 | Schmitter | 64/9 R |
| 2,727,577 | 12/1955 | De Muth | 416/159 |
| 2,744,449 | 5/1956 | Belden et al. | 64/9 R |
| 3,062,435 | 11/1962 | Bentele | 418/60 |
| 3,077,867 | 2/1963 | Froede | 418/60 |
| 3,178,964 | 4/1965 | Peras | 418/151 |
| 3,240,423 | 3/1966 | Jones | 418/60 |
| 3,712,080 | 1/1973 | Shigeura | 64/9 R |
| 3,864,940 | 2/1975 | Black | 64/13 |
| 4,133,188 | 1/1979 | Cartwright | 64/13 |

FOREIGN PATENT DOCUMENTS

| | | | |
|---|---|---|---|
| 604160 | 8/1960 | Canada | 418/94 |
| 604801 | 2/1926 | France | 64/9 R |

Primary Examiner—John J. Vrablik
Attorney, Agent, or Firm—Arthur L. Frederick

[57] ABSTRACT

A multi-unit rotary piston mechanism having each unit separately, rotatively, dynamically balanced and connecting the mainshafts of each unit to each other by a coupling assembly which permits radial and axial flexibility relative to the mainshaft axes and provides adequate torsional capacity for torque transmission between the mainshafts.

4 Claims, 5 Drawing Figures

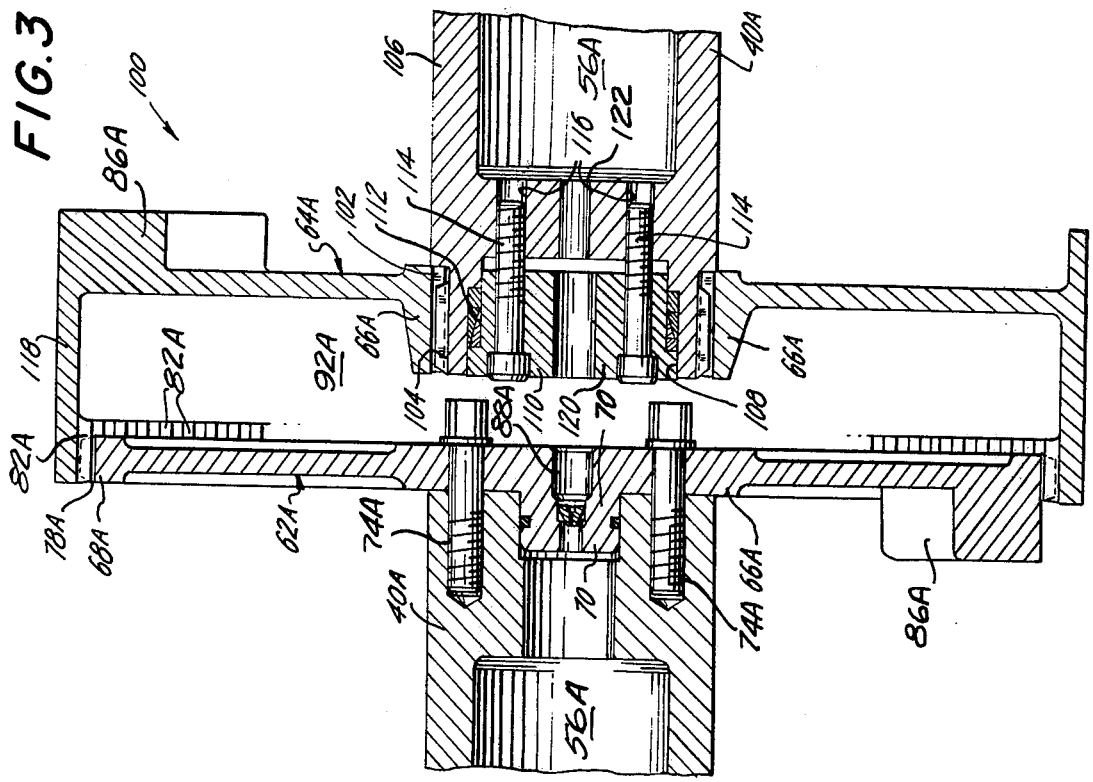
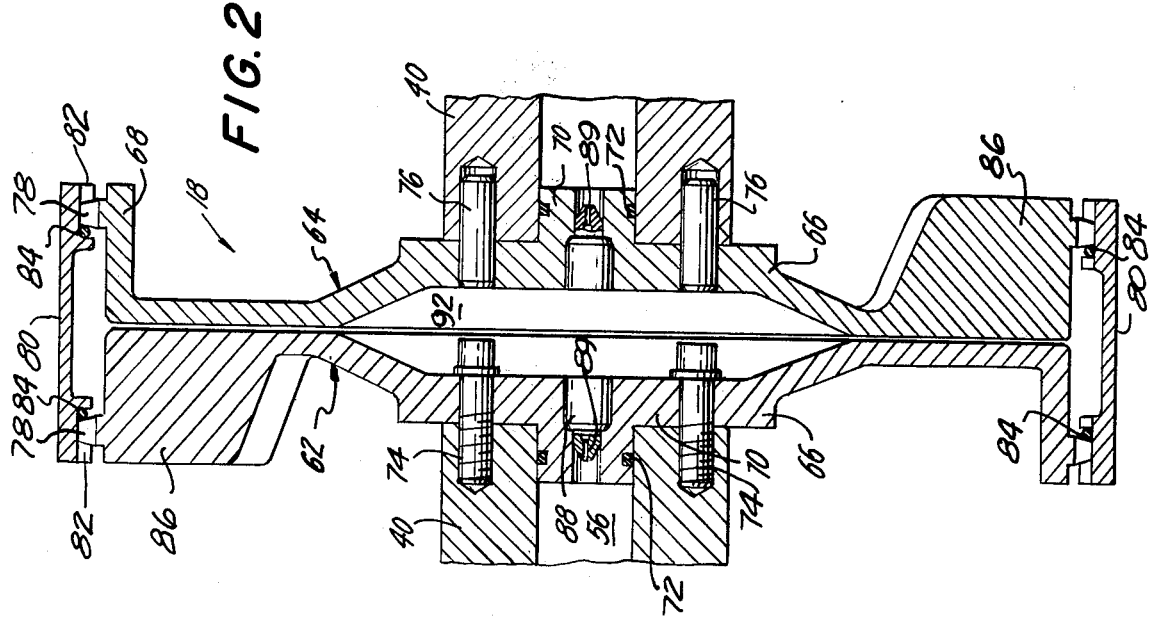

MULTI-UNIT ROTARY PISTON MECHANISM AND MAINSHAFT COUPLING THEREFOR

The invention herein described was made in the course of, or under Contract No. N000 24-77-C-5324 with the Department of the Navy and the Government is licensed under the patent and has minimum rights set forth in ASPR Section 7-302.23(a).

The present invention relates to multi-unit, rotary piston mechanisms of the Wankel type wherein each unit comprises at least one piston mounted on a crankshaft (hereinafter referred to as a "mainshaft") within a housing cavity for planetary rotation within and relative to the housing cavity and which mechanism has coupling means for connecting the mainshafts together for torque transmission.

In multi-unit, rotary piston mechanisms comprising more than three units (a unit being one rotor supported on a mainshaft for planetary rotation in a housing cavity and the housing components defining the cavity), such as exemplified in the U.S. Pat. No. 3,062,435 dated Nov. 6, 1962 to Bentele; U.S. Pat. No. 3,240,423 dated Mar. 15, 1966 to Jones; U.S. Pat. No. 3,694,113 dated Sept. 6, 1972 to Jones et al, the basic problem is to provide a multi-unit, rotary piston mechanism which is capable of quick and easy assembly and disassembly. Heretofore, effort to solve this basic problem has involved various combinations of split timing gears (U.S. Pat. No. 3,062,435 and U.S. Pat. No. 3,193,187 dated July 6, 1965 to Jones et al), split bearings (U.S. Pat. No. 3,694,113 dated Sept. 26, 1972), split intermediate housing walls (U.S. Pat. No. 3,849,035 dated Nov. 19, 1974 to Jones and U.S. Pat. No. 3,791,235 dated Feb. 12, 1974 to Woodier et al) and sectional or composite mainshafts (U.S. Pat. No. 3,924,978 dated Dec. 9, 1975 to Loyd, Jr. et al; U.S. Pat. No. 3,240,423 dated Mar. 15, 1966 to Jones; U.S. Pat. No. 4,090,822 dated May 23, 1978 to Mount et al). These various design efforts have not proven entirely satisfactory even though they facilitate assembly and disassembly of multi-unit, rotary piston mechanisms. Many of these designs are complex and expensive and therefore are not entirely satisfactory. In many composite or sectional mainshaft designs, mainshaft components and/or couplings are subject at their junctures to fretting corrosion. The mainshaft bearings are subject to and must resist thermal gas pressure and centrifugal force loads and accommodate shaft slope deflections resulting from these loads on the shaft and the resulting bending moments to which the mainshafts are subjected and transmitted from the mainshaft of one unit to a mainshaft of another unit. Therefore mainshaft bearings are oversized to handle these transferred forces. The use of split gears is undesirable because of their cost and complexity and split intermediate housing walls pose structural and sealing integrity problems. Also, such heretofore known multi-unit rotary piston mechanisms do not lend themselves to the modular concept wherein mechanisms of a wide range of sizes, capacity or hosepower can be achieved by merely connecting the desired number of two unit modules together. In presently known multi-unit, rotary piston mechanisms of three or more units, the mechanisms are dynamically balanced after the units are assembled; this renders a modular concept unfeasible. However, all of these disadvantages of existing multi-unit, rotary piston mechanism designs are overcome by the present invention.

In heretofore known coupling means of the diaphragm type, as exemplified in the U.S. patents to DeMuth, U.S. Pat. No. 2,727,577, dated Dec. 20, 1955 and Cartwright, U.S. Pat. No. 4,133,188, dated Jan. 9, 1979, there exists the problem of affixing the diaphragms to their respective shafts so as to avoid creep or slippage between the diaphragm and shaft which results in fretting corrosion. This fretting corrosion is particularly evident where the clamping force does not, in relation to the torque forces, provide sufficient frictional engagement between the diaphragm and shaft. This problem of providing sufficient clamping force is particularly difficult in multi-unit rotary piston mechanisms of the Wankel type because of the limitation of space available for bolting. In rotary piston mechanisms of the Wankel type, the diameter of the mainshaft at the point of connection with a diaphragm is fixed by the "K" factor which is the relation of the radius (R) of the rotor to the eccentricity (e) of the rotor axis from the axis of the epitrochoidal inner surface of the housing, or $K=R/e$ (see U.S. Patent to Bentele et al, U.S. Pat. No. 3,102,492, dated Sept. 3, 1963 for a more complete explanation of the "K" factor). The "K" factor determines the diameter of the fixed timing gear which, in turn, determines the diametral size of the mainshaft. Thus, the size and number of connecting bolts is restricted. This problem has been solved by the coupling means, according to this invention.

It is an object of this invention to provide a multi-unit, rotary piston mechanism in which the necessity for split gears, split bearings, oversized bearings, intermediate bearings, split intermediate housing walls are all elimited.

It is another object of the present invention to provide a multi-unit, rotary piston mechanism and a coupling means therefor for connecting mainshafts together in which shaft misalignment in an axial plane, axial spacing of the shafts and radial or lateral displacement of the shafts is compensated for and yet provides the requisite torsional strength for torque transmission between the connected mainshafts and torsional rigidity (stiffness) for avoidance of harmful vibratory resonances between coupled sections.

It is another object of the present invention to provide a multi-unit, rotary piston mechanism and a coupling means therefor for connecting the mainshafts together for torque transfer therebetween wherein sufficient clamping force is achieved to eliminate fretting corrosion at the coupling means.

It is a further object of this invention to provide a multi-unit, rotary piston mechanism and a mainshaft coupling means therefor wherein two rotor (rotary piston) units are provided and the need for intermediate bearings for supporting the mainshafts of such rotor units are eliminated.

It is another object of the present invention to provide a multi-unit, rotary piston mechanism and coupling means therefor in which two rotor units constitute a module and successive modules can be quickly and easily connected together to provide a mechanism of any practical capacity or horsepower.

A still further object of this invention is to provide a multi-unit, rotary piston mechanism in which each unit is isolated from the dynamic bending moments, centrifugal and thermal loads of adjacent units thereby obviating the need for oversized main bearings.

SUMMARY OF THE INVENTION

Accordingly, the present invention contemplates a novel multi-unit, rotary piston mechanism and a novel coupling means therefor, wherein each unit consists of at least one rotor supported by a mainshaft in a housing cavity for planetary rotative movement relative to the housing cavity and which mechanism comprises a counter-weight means for separately, rotatively, dynamically balancing each mainshaft of each unit and the coupling means for interconnecting each mainshaft so as to permit radial and endwise axial flexibility relative to the mainshaft axes of the units and provide torsional stiffness for torque transmission between the connected mainshafts. Thus, each unit is isolated from each other with respect to the dynamic bending moments, centrifugal and thermal forces thereby simplifying the bearing support of the mainshafts, including the obviation of the need for an intermediate bearing. In addition, the present invention permits the assembly of a multi-unit, rotary piston mechanism from a plurality of modules consisting of two rotor units, separately, dynamically balanced, thus permitting a wide range of capacity or hosepower mechanisms at minimal cost.

The coupling means, in accordance with this invention, comprises a diaphragm element secured to the end of the mainshafts of adjacent units of a multi-unit, rotary piston mechanism to be connected at substantially its center portion and so as to lie in a plane substantially normal to the axis of the associated mainshaft to rotate with the latter. The diaphragm elements are of a size in a radial direction relative to the mainshaft axes substantially larger than the diameter of said mainshafts. In addition, a connecting means is provided for connecting the peripheries of the next adjacent diaphragm elements together so as to allow radial and endwise axial flexibility between the diaphragms while providing torsional stiffness for the transmission of torque therebetween. Also the diaphragm elements are preferably connected to their respective mainshafts so that the frictional force is sufficient to effectively permit transfer of torque loads without creep between the diaphragm elements and their mainshafts so that fretting corrosion is obviated.

In one embodiment, the coupling means comprises diaphragm elements each of which is secured at substantially its central portion to the end portions of next adjacent mainshafts. The diaphragm elements are rotatively secured together at their peripheral portions by meshing splines. The diaphragm elements are so constructed and connected together that there is radial and endwise axial flexibility for compensating for misalignments of the mainshafts and dynamic bending moments and centrifugal thermal loads.

In another embodiment, the diaphragm elements are rotatively secured together at their peripheral portions by a ring member having internal splines which mesh with external splines on each of the diaphragm elements.

In a further embodiment, each diaphragm element has a ring secured to its peripheral portion which ring is of cantilever construction and has external splines thereon. The inherent flexibility of the cantilever construction further contributes to the desired radial and endwise axial flexibility.

BRIEF DESCRIPTION OF THE DRAWINGS

The invention will be more fully understood from the following detailed description thereof when considered in connection with the accompanying drawings wherein several embodiments of the invention are illustrated by way of example, and in which:

FIG. 2 is a fragmentary cross-sectional view of the coupling means shown in FIG. 1 and illustrated on an enlarged scale;

FIG. 3 is a view similar to FIG. 2 and showing a coupling means in accordance with another embodiment of the present invention;

DESCRIPTION OF THE PREFERRED EMBODIMENT

Figure 1:
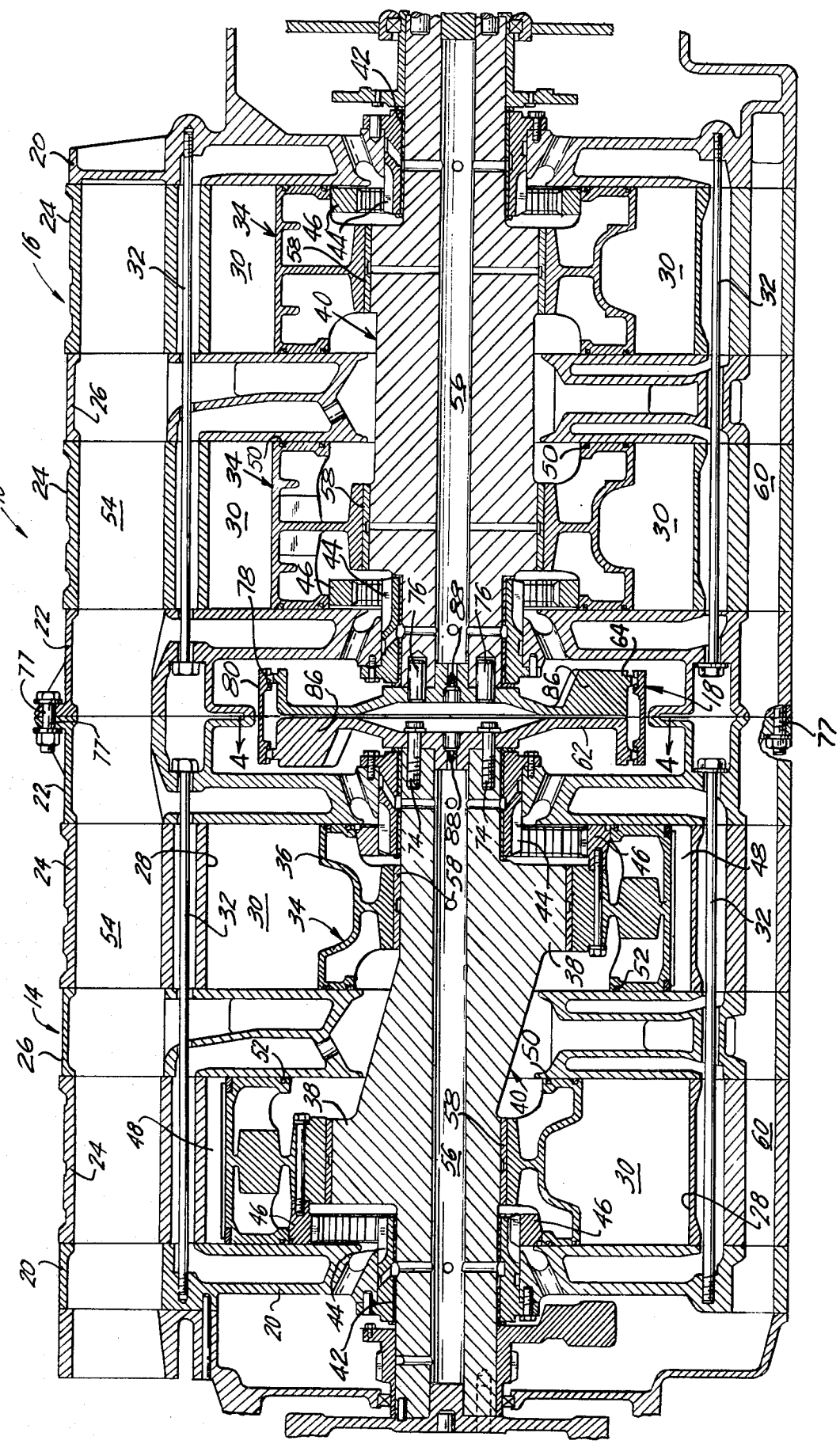
FIG. 1 is a longitudinal cross-sectional view of a multi-unit, rotary piston mechanism according to this invention.

Now referring to the drawings and particularly to FIG. 1, the reference number 10 generally refers to the multi-unit, rotary piston mechanism, according to this invention. The mechanism 10 may be an internal combustion engine, expansion engine, compressor or pump and, as shown, comprises a pair of two rotor (rotary piston) units 14 and 16 connected together by a coupling means 18, according to one embodiment of this invention. While mechanism 10 is shown as a four rotor mechanism, it is to be understood that it may be a three rotor or more than a four rotor mechanism without departure from the scope and spirit of this invention.

The units 14 and 16 are substantially identical in construction and therefore unit 14 will only be described and the like parts of each unit will be identified by the same reference number.

The unit 14 comprises end walls 20 and 22, two trochoid housing walls 24, and an intermediate wall 26 disposed between housing walls 24. Each of the housing walls 24 may have an inner peripheral surface 28 of epitrochoidal configuration to form with adjacent housing walls a two lobe cavity 30. The housing walls 20, 22, 24 and 26 are suitably secured together, as for example, by a plurality of tie bolts 32 to provide two cavities 30.

In each cavity 30 is disposed a rotor or rotary piston 34 which is journaled for planetary rotative movement on a mainshaft 40. In the case of a two lobe epitrochoidal cavity, each rotary piston 34 has a generally triangular shape in profile so that its flank surfaces 36 define with peripheral surface 28 of housing wall 24 and the inner surfaces of walls 20 and 26, three working chambers which successively expand and contract in volumetric size as the rotary piston 34 planetates within the cavity. Each rotary piston is supported on an eccentric portion 38 of mainshaft 40, which, in turn, is supported for rotation in bearings 42 disposed in end housing walls 20 and 22, the bearings being secured to end housing walls 20 and 22 via fixed timing gear 44. The timing gear 44 is disposed in meshing relationship with a ring gear 46 mounted on rotary piston 34. The timing gear and ring gear coact to fix and maintain the angular relationship of rotary piston 34 to the housing cavity 30. Since the unit 14 is only a two rotor unit, and intermediate bearing in intermediate wall 26 is not required.

The unit 14 also has a seal grid system carried by each of the rotors 34 to seal the interstices between the rotor and the walls of its associated cavity and isolate one working chamber from another and the atmosphere. This seal grid comprises the conventional apex seals 48, side seals 50 and oil seals 52. The housing walls 20, 22, 24 and 26 are provided with the usual registered cooling fluid passageways, which may include an inlet cooling fluid manifold 54 and an outlet manifold (not shown), for flowing cooling fluid, such as water, therethrough to remove excess heat from the mechanism.

Lubrication of unit 14 is provided by suitably arranged oil distribution passages in mainshaft 40, including an axially extending main supply passage 56 in mainshaft 40, which main supply passage 56 is connected to a source of pressurized oil (not shown) and to bearings 42 and rotor bearing 58. The main supply passage 56 also supplies oil to coupling means 18 as will be more fully described hereinafter. The housing of unit 14 may also include in the housing walls and oil gallery or reservoir 60 which collects the oil flowing from the parts to be lubricated and, from which reservoir 60, the oil is conducted to means (not shown) for recirculation.

The unit 14 also has suitable fluid inlet and outlet openings for passing fluid into and out of the working chambers in proper timed relationship to rotary piston rotation and the expansion and contraction of the working chambers.

Figure 4:
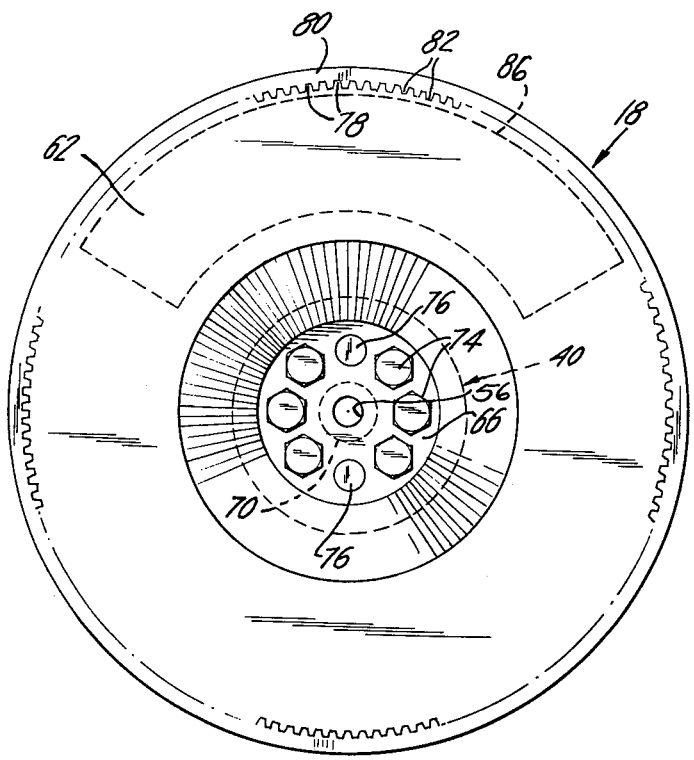
FIG. 4 is a transverse cross-sectional view taken substantially along line 4—4 of FIG. 1 and on the same scale as FIGS. 2 and 3.

The coupling means 18, as best shown in FIGS. 2 and 4, which is employed to interconnect units 14 and 16 together for torque transmission, comprises a pair of diaphragm elements 62 and 64, each of which is secured at a central or hub portion 66 thereof to the adjacent ends of mainshafts 40 of units 14 and 16, and connecting means for securing the peripheral portions 68 of diaphragm elements 62 and 64 together for torque transmission therebetween. In addition to coupling units 14 and 16 together for torque transmission, via coupling means 18, end walls 22 of the housing walls have flanged portions which are secured together by a plurality of bolts 77 so that the manifold 54 and reservoir 60 as well as other cooling fluid flow passages of each unit 14 and 16 are in register.

Each diaphragm element 62 and 64 is disc-shaped and, since each is a mirror image of the other, only diaphragm element 62 will be described and the same reference numbers will be used to identify the same parts on both diaphragm elements. The diaphragm element 62 has, in the central portion 66 thereof, an axially extending projection 70 which is of a diameter to be snugly receivable into a counterbored portion of oil supply passage 56. To seal the interstices between the outer surface of the projection 70 and the counterbored opening, an O-ring 72 is disposed in an annulus in the outer surface of projection 70. The central portion 66 of diaphragm element 62 and the end portion of mainshaft 40 have planar surfaces which are disposed in abutment and which plane of abutment extends substantially normal to the mainshaft longitudinal axis. The diaphragm element 62 is secured to the end portion of mainshaft 40 by a plurality of circumferentially spaced bolts 74 and a pair of dowels 76 (shown in FIG. 4 and in diaphragm element 64 in FIG. 2). The peripheral portion 68 of diaphragm element 62 is in the form of a flange extending axially in a direction toward the associated mainshaft 40 and which has axially extending external splines 78 near its distal end portion. Thus, the splines 78 are cantilever-supported for extra radial freedom. While in FIG. 4 six bolts 74 are shown, it has been found that it is preferable to employ eight or ten bolts 74 to provide, in relation to the expected torque loads, a sufficient friction force for torque transfer without fretting corrosion.

In mechanism 10 having an eccentricity (e) of 1.25 inches, a friction force sufficient to effect transfer of expected peak torque loads of 26,260 inch/pounds can be achieved with the use of eight (8) one-half inch diameter, high strength bolts along with two dowels 76. These bolts 74 are circumferentially arranged on a diameter of 2.875 inches and produce a clamping force of 192,000 pounds and a friction torque of 27,600 inch/pounds when tightened to a yield stress of 150,000 psi. The dowels 76 of ½ inch diameter serve as insurance in the event the peak torque load is exceeded or, for some reason, the friction force produced by the bolts 74 becomes insufficient to transfer the torque loads and thus protects the bolts against the attendant shear stresses. Each dowel is of such size and material as to have a total shear strength of 107,000 inch/pound torque. In the event the dowels 76 are omitted, ten (10) one-half inch diameter, high strength bolts with 20 threads per inch can be circumferentially arranged on a diameter of 2.875 inches. These ten bolts provide a clamping force of 240,000 pounds and a friction torque of 34,500 inch/pounds when tightened to a yield stress of 150,000 psi. Also, the desired clamping force has been achieved with ten (10) seven-sixteenths inch diameter bolts circumferentially arranged on a diameter of 2.937 inches. However, the friction torque was 26,438 inch/pounds which provide too small a margin in relation to the expected peak torque load of 26,260 inch/pounds to be a practical alternative. Since the bolt and dowel diameters and bolt size is a factor of eccentricity (e), the bolt and dowel sizes and bolt diameter dimensions are directly proportional to the amount of eccentricity and, therefore, such dimensions are easily determinable for mechanism 10 having an eccentricity (e) smaller or greater than 1.25 inches. For example, if the eccentricity of another mechanism is 0.625 inches or ½ of the eccentricity of 1.25 inches of mechanism 10, the same number of bolts with two dowels (8) or without dowels (10) will have diametral dimensions of ½ those given in the illustration, namely ¼ inch diameter bolts and dowels, arranged on a circle having a diameter ½ that of 2.875 inches or 1.4375 inches, assuming bolt and dowel material is of the same strength.

The connecting means in this embodiment shown in FIGS. 1, 2 and 4, is a ring 80 having two sets of axially spaced internal splines 82 extending axially and dimensioned to mesh with splines 78 of diaphragm elements 62 and 64. The splines 78 and 82 are preferably dimensioned so that they relatively loosely mesh and thereby permit, in cooperation with the flexibility of cantilevered splines 78 and ring 80, meshing thereof in spite of misalignment in a radial direction, endwise spacing or canted relationship of mainshafts 40 to be connected together. At the same time, the spline interconnection of ring 80 and diaphragm elements 62 and 64 provides a sufficiently torsionally strong assembly that torque load can be transferred between the diaphragm elements 62 and 64 without significant angular deflection. It also provides a sufficiently rigid assembly that vibration is minimized. To retain ring 80 in position relative to diaphragm elements 62 and 64 and splines 82 thereof in mesh with splines 78, a pair of split rings 84 are disposed in annuli formed in the splines 82. The ring 80 has a central portion between sets of splines 82 to reduce weight and distribute lubricant in coupling means 18 herein described.

In accordance with the invention, each of the units 14 and 16, as herein described, are rotatively, dynamically balanced prior to interconnection by coupling means 18. To accomplish this, counterweight means 86 is provided on each of the diaphragm elements 62 and 64. The counterweight means 86 may be a body sector formed integral with and of the material of the associated diaphragm element or a separate member suitably secured to the web portion of the diaphragm element. The body sector may be of sufficient arcuate length, as for example 150°, for dynamic balance. Dynamic balancing of each two rotor unit is achieved in any conventional manner, wherein balance is obtained by machining away counterweight material where and in amounts necessary to achieve dynamic balance. While the counterweight means 86 is preferably made part of or connected to the coupling means 18, such counter-weight means may be separate components connected to the mainshafts to achieve a rotatively, dynamically balanced unit without departure from the scope and spirit of this invention. However, the disadvantage of such an arrangement is that it would result in a mechanism of greater overall size.

To provide for lubrication of the meshing splined teeth 78 and 82, a plug 88 containing a metering orifice 89 (not shown in FIG. 2 but shown in FIG. 5) is secured in an axial bore in the projection 70 which bore extends to communicate supply passage 56 with the space 92 between diaphragm elements 62 and 64. This plug 88 functions to control the flow of oil into space 92 in amounts sufficient to provide the desired lubrication without flooding space 92. In operation of mechanism 10 the coupling means 18, by reason of its capability of compensating for mainshaft static and dynamic misalignments, bending moments and centrifugal and thermal loads, and at the same time providing torsional stiffness to effect torque transmission between the connected mainshafts 40, permits the dynamic rotational balancing of each unit and their interconnection without a further concern about the mechanism having vibrational stability and smooth power output. This fact permits the construction of mechanism 10 of a wide range of capacities or horsepower at minimum cost and relatively quickly and easily since each unit can be treated as a module which merely has to be connected to other modular units to achieve the desired capacity or horsepower mechanism. In addition, the interconnection of the diaphragm elements 62 and 64 by ring 80 enables the mechanism 10, as for example in an internal combustion engine, to provide uniform power impulses. This is accomplished by each of the units or modules being rotationally timed or angularly indexed to give uniform power impulses from the working chambers and insuring the desired uniform power impulses from one unit to the other by omitting a splined tooth in the mating splines 82 of ring 80 and a diaphragm element 62 or 64 and thereby angularly adjusting one unit to the other. In the case of a mechanism 10 comprising two (2) two-rotor units coupled together, the timing of the power impulses is 90° as shown in FIG. 1 to give four power strokes per shaft revolution. Similarly, a mechanism of three (3) two-rotor units coupled together requires the timing of the power impulses to occur every 60° of mainshaft rotation.

In FIG. 3 is shown a coupling means 100 which is another embodiment of the coupling means according to this invention. The coupling means 100 differs from coupling means 18 in that the diaphragm elements are directly spline-connected instead of through a ring as in coupling means 18. Also, one of the diaphragm elements is connected to its associated mainshaft by a different means than shown and described for coupling means 18. The parts of coupling means 100 which correspond to parts of coupling means 18 will be identified by the same number but with the suffix A added thereto.

The diaphragm element 62A is similar to diaphragm element 62 of coupling means 18, but is of flatter disc shape than diaphragm element 62. The peripheral end portion 68A has axially extending splines 78. The diaphragm element 62A is secured at its central or hub portion 66A to the end of a mainshaft 40A in the same manner as described with regard to coupling means 18.

The diaphragm element 64A is substantially different in construction from diaphragm element 64 of coupling means 18 and is connected to its associated mainshaft in a distinctly different manner than diaphragm elements 62 and 64 are connected to their respective mainshafts 40.

The diaphragm element 64A of coupling means 100 comprises a hub portion 66A which has an axial bore and internal splines 102 formed on that bore. The splines 102 are dimensioned to mesh with external splines 104 formed around the end portion of mainshaft 106. An axial recess 108 is formed in the end of mainshaft 106, which recess is dimensioned so as to provide a relatively thin annular wall adjacent splines 104 and to receive a thrust block 110 and frusto-conical wedge assembly 112, as for example, a conventional Ringfeder ring. The thrust block 110 has a shoulder which abuts the wedge assembly 112 when drawn into recess 108 by bolts 114 which pass through holes in thrust block 110 and are turned into threaded holes 116 in mainshaft 106. When thrust block 110 is forced axially into recess 108 by tightening bolts 114, the shoulder thereof abutting wedge assembly 112 forces the wedges together thereby imposing a radial force outwardly against the annular wall adjacent splines 104. Since the annular wall is relatively thin it is deflected radially outwardly thereby locking splines 104 to splines 102 and so connecting diaphragm element 64A to mainshaft 106 that no torsional flexibility is present therebetween and thereby assuring torsional rigidity and minimizing the possibility of fretting.

The peripheral portion 68A of diaphragm element 64 has an axially extending flange or rim 118 which has internal splines 82A formed therein at the distal end portion of the rim. This cantilevered mounting of splines 82A provides desired flexibility between diaphragm elements 62A and 64A at their respective meshing splines 78A and 82A.

It is to be understood that while diaphragm element 64A is shown only connected to its associated mainshaft 106 by a spline-wedge connection, the other diaphragm element 62A may also be connected to its associated mainshaft in the same manner, without departure from the scope and spirit of this invention. Also within the scope of this invention is the connection of the diaphragm elements 62 and 64 to their associated shafts in the same manner as diaphragm element 64A is connected to its mainshaft.

To provide for lubricating meshing splines 78A and 82A of coupling means 100, the thrust block 110 and mainshaft 106 are provided with registered axial bores 120 and 122 which communicate a main oil supply passage 56A in mainshaft 106 with the space 92A between diaphragm elements 62A and 64A.

Figure 5:
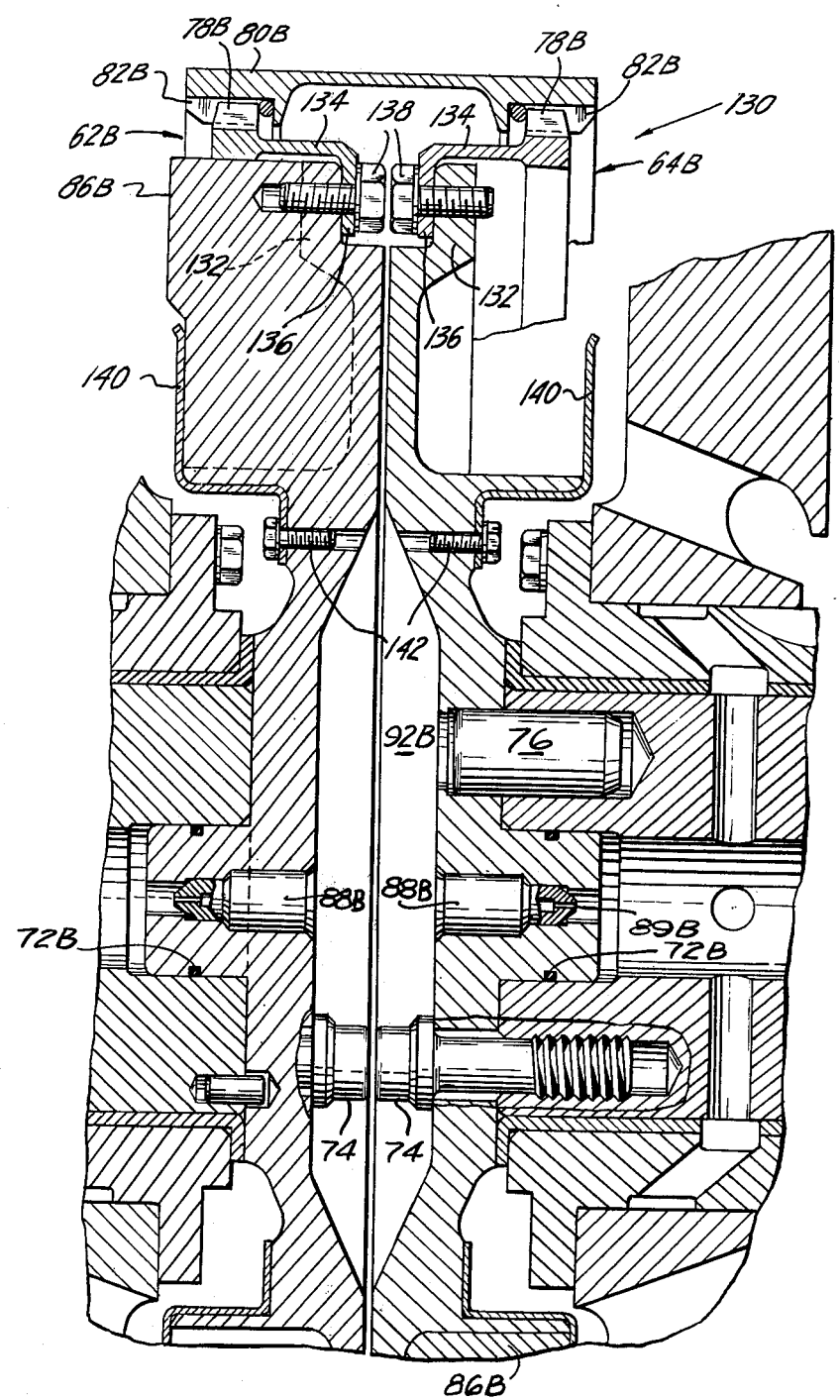
FIG. 5 is a view similar to FIGS. 2 and 3 showing a coupling means in accordance with a still further embodiment of this invention.

In FIG. 5 is shown a coupling means 130, according to a further embodiment of this invention. This coupling means 130 is similar to coupling means 18 and differs from the latter in that the splines 78B are formed on a separate element attached to each of the diaphragm elements rather than formed in the body of the diaphragm elements. Also, a counterweight retaining plate is provided to avoid the churning effect by the counterweights on the oil and the resulting friction losses. Parts of coupling means 130 corresponding to like parts of coupling means 18 will be designated by the same number but with the suffix B added thereto.

The coupling means 130 comprises two generally disc-shaped diaphragm elements 62B and 64B, similar to diaphragm elements 62 and 64 of coupling means 18, which have peripheral, axially offset, portion 132. A ring member 134 having a circumferential flange 136 at one end is attached at flange 136 to the offset portions 132 by a plurality of bolts 138. At the opposite distal end from flange 136, ring member 134 has a plurality of splines 78B formed thereon which mesh with internal splines 82B of connecting ring 80B. As in the other embodiments, splines 78B are cantilever-supported for flexibility. A counterweight 86B is usually found integral with the diaphragm elements but could be a separate element secured by some of the bolts 138 to each of the diaphragm elements 62B and 64B. An oil slinger plate 140 is secured by bolts 42 (one is shown) to each of the diaphragm elements to prevent, as the diaphragm elements rotate, the churning of the oil emitted into the area of the diaphragm elements and the frictional losses resulting therefrom. In all other respects coupling means 130 is the same as coupling means 18 and therefore no further description is deemed necessary.

It is believed now readily apparent that the present invention provides a multi-unit rotary piston mechanism which may be economically and easily constructed of a plurality of inter-connected modular units. The invention provides multi-unit rotary piston mechanism wherein each unit is independently, rotatively, dynamically balanced and connected together so as to provide radial, endwise axial flexibility relative to the mainshaft axes of the connected units that static and dynamic misalignments are compensated for and each unit is isolated from the bending moments, centrifugal and thermal loads of the other and yet torque transmission between the units is accomplished. In the case of two rotor unit, multi-unit, rotary piston mechanisms, the present invention obviates the necessity for split bearings, split timing gears, split intermediate housing walls and intermediate bearings thus providing a simpler and more reliable mechanism than heretofore known mechanisms.

Although several embodiments of the invention has been illustrated and described in detail, it is to be expressly understood that the invention is not limited thereto. Various changes can be made in the arrangement of parts without departing from the spirit and scope of the invention as set forth in the appended claims and as the same will now be understood by those skilled in the art.

What is claimed is:

1. A multi-unit, rotary mechanism wherein each unit consists of at least two rotors supported by a mainshaft in a housing cavity for planetary rotative movement relative to the housing cavity, the mechanism comprising
    (a) counterweight means for separately, rotatively, dynamically balancing each mainshaft of each unit;
    (b) a coupling means for interconnecting each mainshaft so as to permit radial and endwise axial flexibility relative to the mainshaft axes of the units and provide torsional stiffness for torque transmission between said connected mainshafts while eliminating transmission of dynamic bending moments; and
    (c) said coupling means including diaphragm elements of diametral dimensions substantially larger than the diameter of the mainshafts and connected to the endfaces of the mainshafts of next adjacent units, the diaphragm elements of the adjacent units being secured at their respective peripheries to effect torque transmission from one to the other and to the endfaces of their respective mainshafts to provide a frictional force between said diaphragm element and its associated mainshaft sufficient to transfer full torque load between the mainshaft and diaphragm element.

2. The mechanism of claim 1 wherein said diaphragm element includes said counter-weight means.

3. The mechanism of claim 1 wherein the mainshafts have a lubricant supply passage and wherein means for conducting lubricant to the coupling means from said supply passage is provided.

4. The coupling assembly of claim 1 wherein said mainshafts have eccentric portions having an eccentricity of about 1.25 inches and wherein each of said diaphragm elements is connected to the end surface of its associated mainshaft by at least eight high strength bolts of one-half inch size tightened to a yield stress of at least 150,000 pounds per square inch.

* * * * *